May 22, 1923.
B. DE MATTIA
1,456,425
MACHINE FOR FORMING PNEUMATIC TIRES
Filed Feb. 4, 1920  2 Sheets-Sheet 1
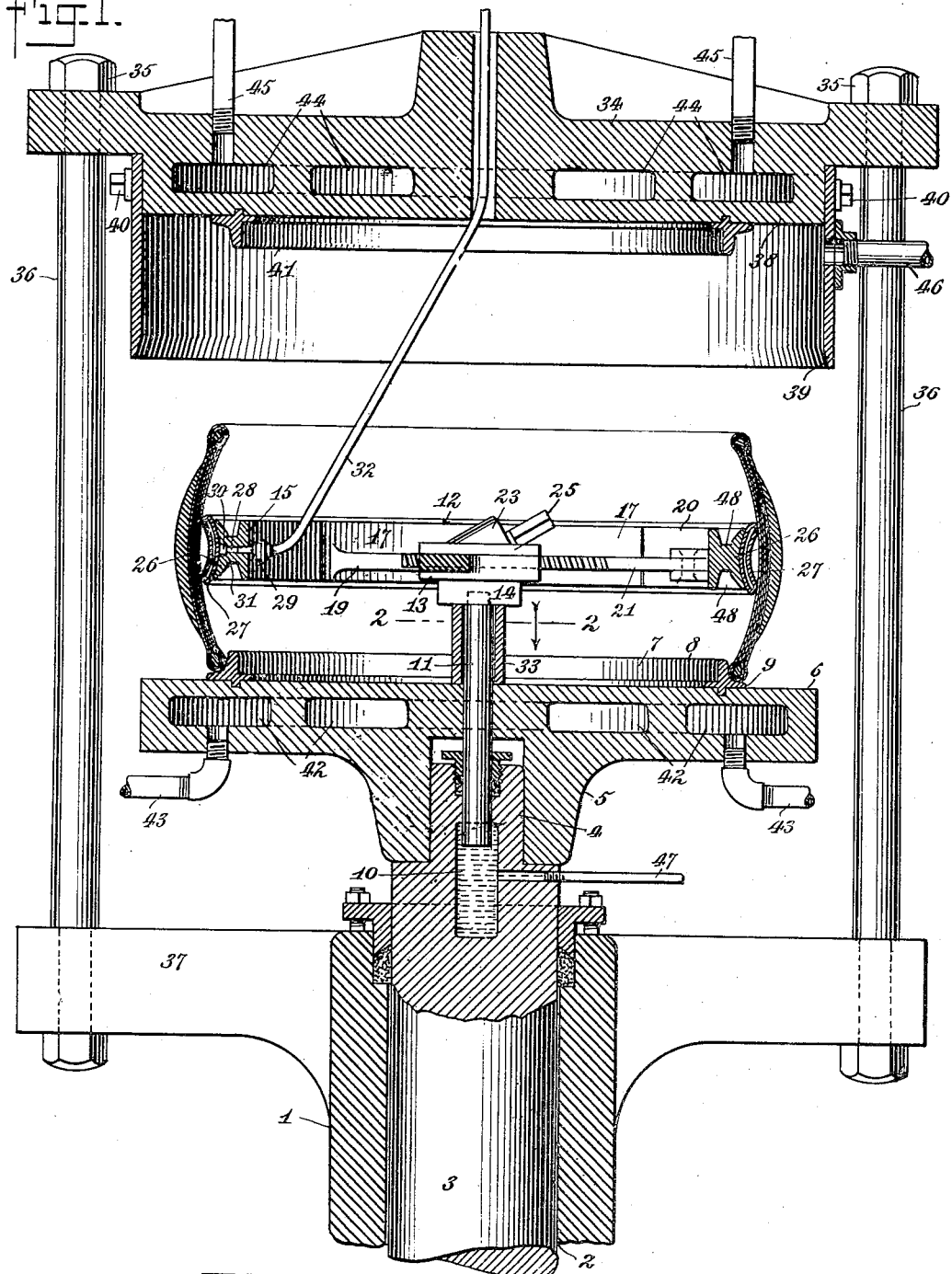

May 22, 1923.
B. DE MATTIA
1,456,425
MACHINE FOR FORMING PNEUMATIC TIRES
Filed Feb. 4, 1920  2 Sheets-Sheet 2
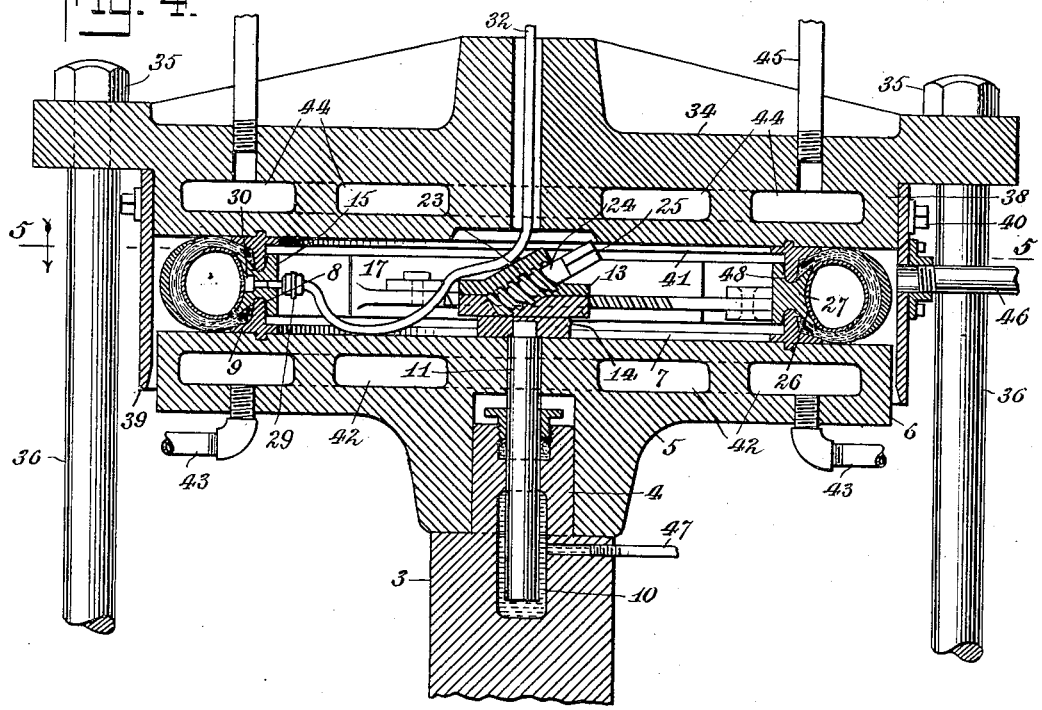
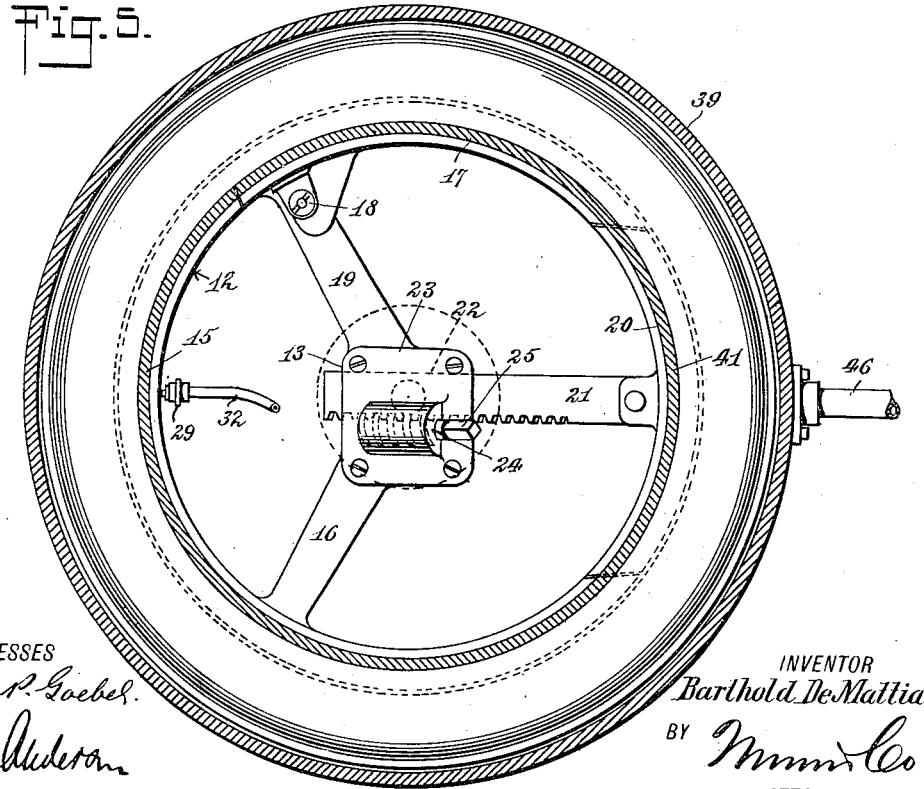
WITNESSES
William P. Goebel.
INVENTOR
Barthold De Mattia
BY
ATTORNEYS Patented May 22, 1923.

1,456,425

UNITED STATES PATENT OFFICE.

BARTHOLD DE MATTIA, OF CLIFTON, NEW JERSEY.

MACHINE FOR FORMING PNEUMATIC TIRES.

Application filed February 4, 1920. Serial No. 356,209.

*To all whom it may concern:*

Be it known that I, BARTHOLD DE MATTIA, a citizen of the United States, and a resident of Clifton, in the county of Passaic and State of New Jersey, have invented a new and Improved Machine for Forming Pneumatic Tires, of which the following is a full, clear, and exact description.

The present invention relates to machines for manufacturing shoes or casings for pneumatic tires, and it has for its object to produce a machine in which a cylindrical tire blank built up of superimposed layers of bias fabric, and suitable cushioning and tread strips, with a bead incorporated in its opposite edges, may be expanded and shaped to conform to the conventional shape of shoes or casings for the subsequent operation of vulcanization.

To the above ends the present invention consists of the devices and combinations of devices which will be hereinafter described and claimed.

The present invention is illustrated in the accompanying drawings, in which,

Figure 1 shows the upper portion of a tire-forming machine embodying the invention, parts being shown in elevation, and parts in diametrical cross-section; also showing a tire blank in position prior to shaping;

Figure 2 shows a section taken on the line 2—2 in Figure 1;

Figure 3 shows a perspective view of the removable support for the collapsible core;

Figure 4 shows a view similar to Figure 1, with the machine closed upon and subjecting an expanded shoe or casing to a shaping pressure;

Figure 5 shows a sectional view taken on the line 5—5 of Figure 4, looking in the direction of the arrow, parts being shown in plan.

The machine comprises a cylindrical standard 1 having a central bore 2, in which is supported for vertical movement, a piston 3. The upper part of the machine, only, is illustrated in the drawings, but it will be understood that the piston 3 is, at its lower end, acted upon by fluid pressure controlled by the operator, whereby to raise the piston 3 as required, and to permit its depression. The piston 3, at its upper end, is provided with a cylindrical boss 4 upon which is fitted the socketed, depending bearing 5 of a circular table 6. Upon the upper surface of the table 6, is detachably and removably supported, a flanged, molding ring 7, the outer circumference of the flange 8 of which, with a horizontal flange 9, receives and supports the bead at one edge of the tire blank. The piston 3 is provided at its upper end with a fluid-pressure chamber 10 in which is mounted a piston 11 which may be raised and lowered as required.

The piston 11, at its upper end, supports the collapsible core 12, which core comprises a chuck 13 having upon its under surface a block 14 fitted to the upper end of the piston 11. The core 12 consists of a section 15 carried by the arms 16 and 19 of the chuck 13 and a section 17 pivotally connected at 18 to the arm 19 of the chuck, so as to swing about the pivot 18, and a section 20 fitting between the ends of the sections 15 and 17, to complete the core, and forming a key section. The key section is carried by a rack bar 21 which has a sliding movement in a guideway 22 of the top plate 23 of the chuck, and is engaged by a worm 24 mounted in the top plate 23, and provided with means such as the polygonal, projecting end 25 adapted to be engaged by a key to turn the worm, thus to reciprocate the rack-bar 21, to move the key section 20, inward from the position shown in Figure 5, to permit the pivoted section 17 to be swung inward to collapse the core.

The core sections upon the outer surfaces are provided with a concave bearing-seat 26, adapted to receive and support an elastic, inflatable tube 27.

The core section 12 is provided with a bore 28, to which an air-inlet 29 is attached upon its inner surface, and at its outer surface is recessed as at 30, to receive the nipple 31 of the collapsible, inflatable tube 27. A flexible pipe 32 supplies air as required, for the purpose of inflating the tube 27.

A removable rest 33, consisting of a metallic block, substantially U-shaped in cross-section, is provided, which may be fitted about the piston 11, upon the upper surface of the table 6, to support the chuck and core temporarily in the position shown in Figure 1.

Co-operating with the instrumentalities which have been described, the machine comprises a cross-head 34, fixedly secured as by the nuts 35, to the upper ends of rods 36, supported at their lower ends, in laterallyextending arms 37 forming part of the cylindrical casing 1. Upon its under surface, the cross-head 34 is provided with a circular projection 38 of substantially the same diameter as the table 6, which is also circular in form, the projection 38 being surrounded by a depending, circular flange 39, secured to the projection 38 by means of bolts 40, the flange 39 being of sufficient depth to enclose the chuck and tire, and the table 6, when the parts are in position as shown in Figure 4.

Secured to the under surface of the projection 38 is a flanged molding ring 41, corresponding to the molding ring 7 mounted upon the upper surface of the table 6, and arranged to engage the upper, beaded edge of the tire blank and support and apply pressure thereto as shown in Figure 4.

The tire blank as it comes to the machine is substantially cylindrical and as a preliminary operation, and while supported in the position shown in Figure 1, the collapsible core with the intermediate, inflated tube 27, is positioned and supported at a point coinciding with the longitudinal medial line of the cylindrical blank, and the expansion of the core to bring the members thereof into operative position slightly expands the central portion of the tire blank, as shown in Figure 1. When thus positioned, the collapsible tube 27 may be inflated sufficiently so as to support the collapsible core by contact of the expanded tube with the inner surface of the cylindrical blank. After this has been done, the rest or block 33 may be removed, prior to the subsequent operation of the machine.

As the tire blank is composed of uncured rubber, it is proposed to expand that portion of the blank lying between the beaded edges, while simultaneously pressing the beaded edges towards each other, and this operation is greatly facilitated by heating the parts of the machine. For this purpose, the table 6 is hollowed out as shown at 42 and suitable conductors 43 are connected therewith to permit circulation of heating fluid therein, and in like manner, the projection 38 is provided with a chamber 44 and with conductors 45 to permit of the circulation of heating fluid therein, and also, preferably, the depending flange 39 will be provided with a hot-air inlet 46 whereby heat may be admitted to the space in which the inflated tire is being pressed and shaped.

A suitable inlet 47 is provided to the fluid chamber, beneath the piston 11, to raise and lower the piston 11 as required.

Assuming that the tire blank is supported as shown in Figure 1, and the block 33 has been removed, the piston 3 is raised until the upper beaded edge of the tire blank engages the molding ring 41 beneath the projection 38, at which time, and simultaneously with the movement of the parts towards each other to cause the beaded edges of the blank to approach each other, the air pressure supplied to the inflatable tube 27, by means of a flexible pipe 32, expands the tire blank between the beaded edges, the superimposed layers of fabric or the bias strips constituting such layers, spreading and yielding to permit such expansion. As the expansion takes place, the beaded edges are forced closer and closer together until they are forced to occupy the grooves 48 in the core sections, and given the desired shape, and the shoe or casing given the necessary circular shape in cross-section, or the conventional shape of a shoe or casing, during which operation the inflated tube 27 constitutes a mandrel or core for shaping the tire. The position of the parts when the shoe or casing is subjected to pressure, is shown in Figure 4, and while in this position, the pressure applied thereto, together with the action of the heat admitted, not only to the table 6 and the projection 38, but also directly to the surface of the tire or shoe, causes the shape to be substantially fixed after a few moments of pressure.

When the expansion and shaping has been sufficiently accomplished, the collapsible core with the tire thereon may be removed from the machine, and the tire removed and vulcanized to cause it to retain permanently the shape imparted thereto, by any suitable vulcanizing means.

I would call attention to the fact that a tire produced as here described is to be distinguished from all other tires, by the fact that the beaded edges are formed without any prepared bead core, the same being formed simultaneously with the tire, and that the shape of the tire is attained by the expansion of the material lying between the beaded edges rather than by the compression and gathering of the material adjacent to the beaded edges. It will be observed that the flexible pipe 32 passes upward through a central opening 49 leading out of the cross-head 34.

I claim:

1. In a machine of the class described, in combination, a collapsible core comprising sections movable relatively to each other, a curved seat on the outer surface of the core, a collapsible tube fitted thereto and means to expand said tube within a cylindrical tire blank surrounding the collapsible core.

2. In a machine of the class described, in combination, a table or support, a cross-head co-operating therewith, means for raising or lowering the table or support, means for expanding a tire blank, and fluid pressure means to raise or lower the expanding means toward and from the upper surface of the table.

3. In a machine of the class described, in combination, a table, a support thereon for one edge of a cylindrical tire blank, a piston movable through the table, a core supported by said piston, a tire blank expanding and shaping device supported by the core, a crosshead having a moulding ring supported thereby to engage the opposite edge of the tire blank, means for raising or lowering the table, means for expanding a tire blank and independent fluid pressure means for raising or lowering said piston and the core and the expanding means supported thereby.

4. In a machine of the class described, in combination, a table, a support thereon for one edge of a cylindrical tire blank, a crosshead having a molding ring supported thereby to engage the opposite edge of the tire blank, a depending circular flange carried by said crosshead, means for expanding a tire blank, and means to supply heated fluid to the table and crosshead and to the space in which the tire is positioned.

5. In a machine of the class described, in combination, a table, a support thereon for one edge of a cylindrical tire blank, a piston movable through the table, a core supported by said piston, a tire blank expanding and shaping device supported by the core, a crosshead having a molding ring supported thereby, to engage the opposite edge of the tire blank, a depending circular flange to enclose the chuck and tire when the tire is being pressed and shaped, means to move the table and the tire blank supported thereon toward the crosshead to press the edges of the tire blank toward each other about the expanding device, means to supply heated fluid to the table and crosshead, and means to supply heated fluid to the space in which the tire is positioned.

6. In a machine of the class described, in combination, a piston for raising or lowering a table, a molding ring supported thereon for one edge of a cylindrical tire blank, a piston movable through said table and supported by said first-named piston for raising or lowering a core and tire expanding means, and a crosshead having a complementary molding ring supported thereby to engage the opposite edge of the tire blank.

7. In a machine of the class described, in combination, means to support a cylindrical tire blank, means comprising a pneumatic inflatable tube for engaging the tire blank and expanding it between the beaded edges thereof, means to force said beaded edges toward each other, means to enclose the inflating and shaping devices while the tire blank is under pressure therein, and means to supply heated fluid to the space surrounding the tire blank.

8. In a machine of the class described, in combination, a table or support, a crosshead cooperating therewith, fluid pressure mechanism for raising or lowering the table or support, means for expanding a tire blank, and independent fluid pressure means to raise and lower the expanding means toward and from the upper surface of the table.

9. In a machine of the class described, in combination, a table, a support thereon for one edge of the cylindrical tire blank, a piston movable through the table, a collapsible core comprising sections movable relatively to each other supported by said piston, a curved seat on the outer surface of the core, a collapsible tube fitted thereto and means to expand said tube within a cylindrical tire blank surrounding the collapsible core.

BARTHOLD DE MATTIA.

Witness:
M. S. C. WHITEHEAD.